June 12, 1962     J. B. JONES     3,038,358
ULTRASONIC DEVICES
Filed Dec. 30, 1957

INVENTOR.
JAMES BYRON JONES

BY Arthur H. Seidel

ATTORNEY 3,038,358
ULTRASONIC DEVICES
James Byron Jones, West Chester, Pa., assignor to Aeroprojects, Inc., West Chester, Pa., a corporation of Pennsylvania
Filed Dec. 30, 1957, Ser. No. 705,874
5 Claims. (Cl. 78—82)

This invention is directed to ultrasonic devices, and more particularly to ultrasonic devices for delivering ultrasonic energy at high power levels.

In recent years ultrasonic devices have been employed for a variety of operations in which such devices deliver ultrasonic energy at a high power level to a workpiece. For example, ultrasonic devices of this nature have been employed for soldering, brazing, welding, and machining. In ultrasonic devices where it is essential to deliver ultrasonic energy at a high power level, it is desirable that the tip or end contacting the workpiece be secured to the remainder of the ultrasonic device in such fashion that attenuation of energy is maintained at a minimal level. The most efficient form of coupling of a tip to an ultrasonic device is by means of a metallurgical bond, as by brazing the tip to the ultrasonic device. However, such metallurgically joined tips are not practical where changing of the tip is necessary. Thus, where different size tips are required, and changing of the tip from time to time is necessary for this and other reasons, it is impractical to rely upon a metallurgically bonded tip.

It has been suggested to employ threaded members for tips in ultrasonic devices, see for example the following United States Letters Patents: 2,651,148; 2,704,333; 2,748,298; and 2,792,674. Such threaded type tips are relatively inefficient in applications, such as ultrasonic welding, where the devices applying an appreciable force level to the work are used; and especially where the tip contacting member is vibrating in flexure to apply primarily shear-type vibration to the work, it is important that the mechanically-attached tip be positively driven without slop or play and that all associated threaded or sharply cut elements be designed to minimize the possibility of fatigue failure as well as to minimize the possibility of attenuation of energy at the interface between the coupler and the tip.

This invention has as an object the provision of an ultrasonic device having an easily replaceable tip which is capable of delivering ultrasonic energy most efficiently to the workpiece.

This invention has as another object the provision of an ultrasonic device having readily replaceable tips.

This invention has as yet another object the provision of an efficient ultrasonic device of relatively low cost.

Other objects will appear hereinafter.

For the purpose of illustrating the invention there is shown in the drawings forms which are presently preferred; it being understood, however, that this invention is not limited to the precise arrangements and instrumentalities shown.

Referring to the drawings wherein like reference characters refer to like parts:

Figure 1:
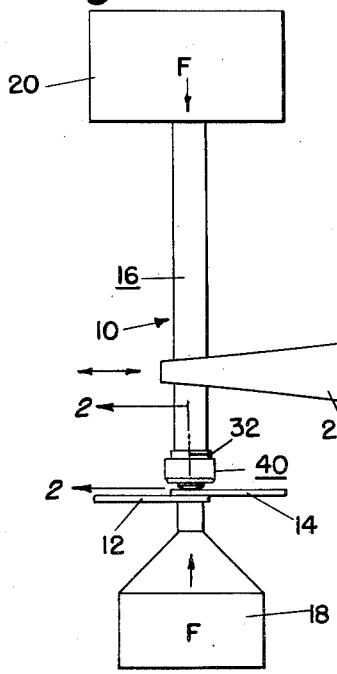
FIGURE 1 is a longitudinal sectional view of a preferred embodiment of the present invention.
Figure 2:
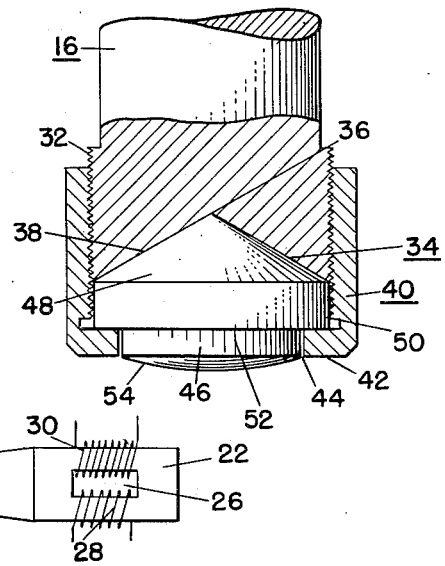
FIGURE 2 is a sectional view taken on line 2—2 of FIGURE 1.

Referring to the drawings, and initially to FIGURES 1 and 2 there is shown therein the ultrasonic device designated generally as 10, which in the illustrated embodiment is an ultrasonic welder. Vibratory welding processes and apparatus have been described in patent applications filed in the name of James Byron Jones, William C. Elmore, and Carmine F. DePrisco, namely Serial No. 467,382, filed November 8, 1954 for "Method and Apparatus Employing Vibratory Energy for Bonding Materials," now abandoned; Serial No. 579,780, filed April 23, 1956 for "Method and Apparatus Employing Vibratory Energy for Bonding Metals"; Serial No. 579,779, filed April 23, 1956 for "Vibratory Seam Welder and Vibratory Seam Welding Process"; and Serial No. 610,991, filed September 5, 1956 for "Method and Apparatus Employing Vibratory Energy for Bonding Metals."

The disclosures of each of the above-identified patent applications is incorporated into the subject patent application and made a part hereof.

The metal workpieces 12 and 14 are welded together in accordance with the process of the present invention intermediate the sonotrode 16 and the massive anvil or support 18.

The sonotrode 16 in the embodiment of the present invention shown in FIGURE 1 comprises a cylindrical rod which is an acoustical reed of metal and which is restrained and supported cantilever-like by the mass 20 on the upper end thereof. The force necessary to maintain the metal workpieces 12 and 14 being welded in regulated alignment and firm contact is designated diagrammatically as "F" and may be supplied in practice by suitable mechanical means which may consist of spring means, compressed air cylinder means, hydraulic cylinder means, and the like.

The reed-like sonotrode 16 is vibrated in flexure by means of the transducer 22 and the coupler member 24, which may comprise a tapered metallic element brazed or otherwise metallurgically secured in end-to-end engagement to transducer 22, and which encircles and is metallurgically joined, as by brazing, to a portion of the sonotrode 16 intermediate its ends.

The coupling member 24 may be, but need not necessarily be, tapered so as to satisfy the equation set forth at page 163 of Piezoelectric Crystals And Ultrasonics, by Warren P. Mason, published in 1950 by Van Nostrand Company, namely a curved coupling member whose taper is an exponential function of its length and satisfies the equation:

$$S = S_0 e^{-2T1}$$

where S equals the original area, $S_0$ equals the reduced area, T equals the taper constant, and 1 equals the length of the tapered section.

The transducer 22 comprises a laminated core of nickel or other magnetostrictive metallic material, and may have a rectangularly shaped opening 26 in its center portion. A polarizing coil 28 and an excitation coil 30 may be wound through the rectangularly shaped opening 26 within the transducer 22. Upon variations of the magnetic field strength of the excitation coil 30, there will be produced concomitant variations in the dimension of the transducer 22, provided the polarizing coil 28 is charged at a suitable level with D.C. current, and that the frequency of the aforesaid variations, namely the expansion and/or contraction of the magnetostrictive transducer 22 will be approximately equal to the frequency of the alternating electric current flowing in excitation coil 30.

In place of the transducer 22 shown in the drawings, other magnetostrictive materials such as the alloy 2–V Permendur (an iron-cobalt alloy), a nickel-iron alloy, or Alfenol (an aluminum-iron alloy), each of which should be properly dimensioned to insure axial resonance with the frequency of the alternating current applied thereto, so as to cause it to decrease or increase in length according to its coefficient of magnetostriction. Transducers of the aforesaid type constitute a preferred embodiment for operation at frequencies of up to about 75,000 cycles per second. In place of the aforesaid metallic magnetistrictive materials, the transducer may comprise almost any material which has good physical properties and which changes its physical dimensions under the influence of an electric potential. Thus, it may comprise a piezoelectric ceramic, such as barium titanate, or lead zirconate, or a natural piezoelectric material, such as quartz crystals. Such materials are preferably used at high frequency operations, as at frequencies above about 75,000 cycles per second. The transducer may also consist of ferroelectric materials or an electromagnetic device, such as that which actuates a radio loudspeaker.

The coupling system for conducting the vibratory energy from the transducer 22 to the workpieces 12 and 14 comprises the coupling member 24 and the sonotrode 16. The coupling system preferably should resonate at the transducer's operating frequency and should be insensitive to applied forces, so that the welding apparatus may operate efficiently under the welding process conditions and dispense vibratory energy via the vibrating jaw which engages the metals being welded without adverse effect upon the transducer-coupling system, such as stalling, or damping, or shifting of the resonant frequency of the transducer-coupling system.

In operation, the transducer 22 vibrates coupling member 24 which in turn vibrates the sonotrode 16 in the path indicated by the lower double-headed arrow in FIGURE 1. The vibratory movement of sonotrode 16 in flexure in the indicated direction effects welding between the workpieces 12 and 14.

The free end portion of sonotrode 16 comprises the threaded cylindrical projection 32. The end face 34 of cylindrical projection 32 is formed as a conically-shaped cavity. The apex 36 of the conically-shaped cavity of end face 34 lies on the longitudinally axis of sontrode 16. The conical cavity of end face 34 should be formed so that the sides 38 thereof (as seen on a vertical section) are disposed at an angle of between five to eighty-five degrees to the axis of sonotrode 16, preferably betwen ten degrees and sixty degrees to the axis of sonotrode 16. The surface finish of the cavity on end face 34 should be as smooth as possible.

A collet 40 having female threads which mate with the male threads of cylindrical projection 32 is threadably carried on cylindrical projection 32. Collet 40 is provided with an inwardly projecting land 42 at its free end which defines a circular opening 44 in the collet 40.

The replaceable tip 46 is nestingly received intermediate the end face 34 of the cylindrical projection 32 of sonotrode 16 and the collet 40.

In the embodiment shown in FIGURES 1 and 2 the replaceable tip 46 is formed from a unitary integral metal member. Replaceable tip 46 includes a conical end 48 having a highly polished conical face which is matingly received within the conically-shaped cavity in end face 34. As precise a fit as possible is desirable between the conical end 48 of replaceable tip 46 and the conically-shaped cavity in end face 34. The conical end 48 should likewise have sides (as seen on a vertical section) disposed at an angle of between five to eighty-five degrees to the longitudinal axis of tip 46, and preferably between ten degrees and sixty degrees to such axis.

The conical end 48 of replaceable tip 46 is carried upon the relatively wide cylindrical portion 50 of replaceable tip 46. The relatively wide unthreaded cylindrical portion 50 is received within collet 40, with the inside face of land 42 being juxtaposedly engaged with the end face of relatively wide cylindrical portion 50, the land 42 functioning as a stop-shoulder, and retaining the replaceable tip 46 in position and operatively secured to the sonotrode 16.

The relatively narrow cylindrical portion 52 of replaceable tip 46 projects from the relatively wide cylindrical portion 50 through the circular opening 44. Relatively narrow cylindrical portion 52 includes the work face 54 which engages the workpieces being acted upon by the ultrasonic device 10. The work face 54 may be contoured to meet any specific working requirements, and may be arcuately shaped, as shown in FIGURE 2 wherein the work face 54 comprises a minor segment of the outside of a sphere.

Figure 3:
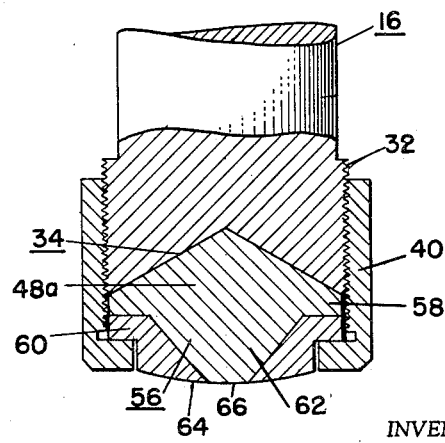
FIGURE 3 is a fragmentary sectional view, similar to that of FIGURE 2, but showing another modification of the present invention.

In the embodiment of the presnt invention shown in FIGURE 3, the sonotrode 16 and the collet 40 are identical to the coupler and collet shown in FIGURES 1 and 2. However, in place of the replaceable tip 46, which as heretofore noted was a unitary integral element, the replaceable tip 56 of the embodiment of FIGURE 3 comprises portions 58 and 60 which are matingly engaged with each other, and preferably brazed together. The portion 58 includes the conical end 48a which is received within the conically-shaped cavity of end face 34 of the cylindrical projection 32 of sonotrode 16. Portion 58 also includes a frusto-conical depending portion 62 which is matingly received within a mating cavity of portion 60.

The work face of replaceable tip 56 comprises the work face portion 64 of portion 60 and the work face portion 66 of portion 58.

The replaceable tip construction of the embodiment of FIGURE 3 may be used when tips having special requirements are needed. For example, in the embodiment of FIGURE 3, it is possible to simultaneously apply electrical current through the sonotrode 16 and replaceable tip 56 to the workpiece along with the ultrasonic energy. This can be accomplished by forming the sontrode 16, collet 40 and portion 60 of replaceable tip 56 of a good conducting metal, such as an alloy of beryllium and copper. Desirable strength and hardness characteristics for the center of the work face may be conferred upon the replaceable tip 56 by forming the portion 58 thereof of hard tool steel.

While the illustrated embodiment is intended for use on a spot welder, it is to be understood that the same may be used on a seam welder, such as disclosed in aforementioned United States application Serial No. 579,779.

Welding is effected under a clamping force sufficient to hold the metals being welded in firm contact at the intended weld interface.

The clamping force may thus be varied over a very wide range. Thus, in a preferred embodiment, the maximum clamping forces need not produce an external deformation [1] of more than about 10% in weldments effected at room or ambient temperatures. In many cases the extent of deformation is appreciably below 10% and in some instances may be virtually absent altogether. The minimal clamping force to be used in the process of this invention constitutes a force sufficient to maintain the metals being welded in regulated alignment and firm contact, e.g. contacting each other so that the weld may be effected by the application of vibratory energy.

The range of operative clamping pressures which may be employed may be readily ascertained by the user of the process. In all cases the clamping force must be sufficient to effect coupling between the metals being welded and the source of vibratory energy, so that such vibratory energy may be transmitted to the metals.

The operative range of vibratory welding frequencies which may be used includes frequencies within the range 59 to 300,000 cycles per second, with the preferred range constituting 400 to 75,000 cycles per second, and the optimum operating frequency range lying between about 5,000 and 40,000 cycles per second. This optimum range of operating frequencies may be readily achieved by transducer elements of known design, which are capable of generating elastic vibratory energy of high intensity.

Welding may be and in many instances is initiated at room temperatures or ambient temperatures without the

---

[1] By deformation is meant the change in dimensions of the weldment adjacent the weld zone divided by the aggregate thickness of the weldment members prior to welding; result multiplied by 100 to obtain percentage.

application of heat.[2] If desired, welding may also be initiated at elevated temperatures below the fusion temperature (melting point or solidus temperature of any of the pieces being bonded).[3] Thus, heating the metals to be welded prior to, and/or during welding to a temperature below their fusion temperature may, in some cases, facilitate the ease of welding and lower the power requirements and/or time requisite to achieve welding. The welding process is applicable to forming both spot and seam welds.

The welding process may be applied to a wide variety of metals, examples of which include: pure aluminum to pure aluminum; aluminum alloy to aluminum alloy; copper to copper; brass to brass; magnesium alloy to magnesium alloy; nickel to nickel; stainless steel to stainless steel; silver-titanium alloy to silver-titanium alloy; gold-platinum alloy to stainless steel; platinum to copper; platinum to stainless steel; gold-platinum alloy to nickel; titanium alloy to titanium alloy; molybdenum to molybdenum; aluminum to nickel; stainless steel to copper alloy; nickel to copper alloy; nickel alloy to nickel alloy; sintered aluminum powder to sintered aluminum powder[4]; etc.

The spot-type welding process embodiment may be accomplished within a wide time range, such as a time range of between about 0.001 second to about 6.0 seconds, or somewhat more, with welding under most normal conditions being effected during a time interval of from several hundredths of a second to several seconds.

The welding of most metals can be effected in the ambient atmosphere. However, the process comprehends welding in highly evacuated atmospheres, or in selected atmospheres, such as atmospheres comprising an inert gas. Furthermore, while the welding process may be effected with metals, such as aluminum, without the extensive precleaning required to effect satisfactory welding by other methods, a degree of precleaning and surface treatment may prove advantageous in the welding of many metals. It is desirable prior to effecting welding in accordance with the present invention to remove surface contaminants, such as hydrocarbon or other lubricants and the like.

The replaceable tips of the present invention permit rapid tip replacement and the substitution of work faces of desired contour in installations where different work faces are required to perform different operations. Moreover, the replaceable tips of the present invention may be rapidly replaced on being worn.

The present invention may be embodied in other specific forms without departing from the spirit or essential attributes thereof and, accordingly, reference should be made to the appended claims, rather than to the foregoing specification as indicating the scope of the invention.

By "ultrasonic" as used in the following claims is meant to include sound energy both within and without the audible range, as for example vibratory energy within the frequency range of 59 to 300,000 cycles per second.

It is claimed:

1. An ultrasonic device tip comprising an elongated vibration-transmitting member, a conically shaped cavity occupying the entire end surface at one end of said vibration-transmitting member, a collet threadably secured about said end of said vibration-transmitting member, said collet having an opening in its end face, a replaceable tip carried intermediate said end face of said vibration-transmitting member and said collet, with said replaceable tip including a conically-shaped element nestingly mated within the conically-shaped cavity of the vibration-transmitting member and a projection extending through the opening of said collet, and with said collet clamping said replaceable tip tightly within said conically-shaped cavity in abutting contact with the surface defining said cavity.

2. An ultrasonic device tip in accordance with claim 1 in which the replaceable tip is integrally formed from a single piece of metal having transverse dimensions not greater than the largest transverse dimension of said cavity.

3. An ultrasonic device tip in accordance with claim 1 in which the replaceable tip comprises a plurality of portions, with one of said portions being mated within another of said portions, the largest transverse dimension of said portions being not greater than the largest transverse dimension of said cavity.

4. An ultrasonic device tip in accordance with claim 1 in which the sides of the conically-shaped cavity of the vibration-transmitting member and the conical portion of the replaceable tip are disposed at an angle of between five degrees and eighty-five degrees to the longitudinal axis of said tip.

5. An ultrasonic device tip in accordance with claim 4 in which the sides of the conically-shaped cavity of the vibration-transmitting member and the conical portion of the replaceable tip are disposed at an angle of between ten degrees and sixty degrees to the longitudinal axis of said tip.

References Cited in the file of this patent

UNITED STATES PATENTS

| | | |
|---|---|---|
| 996,573 | Eveland | June 27, 1911 |
| 1,121,085 | Fitzgerald | Dec. 15, 1914 |
| 1,560,486 | Rummins | Nov. 3, 1925 |
| 1,992,990 | Burns | Mar. 5, 1935 |
| 2,043,442 | McNeil | June 9, 1936 |
| 2,222,906 | Hentzen | Nov. 26, 1940 |
| 2,364,938 | Beard | Dec. 12, 1944 |
| 2,376,776 | Jones | May 22, 1945 |
| 2,393,771 | Heintz | Jan. 29, 1946 |
| 2,619,604 | Burns | Nov. 25, 1952 |
| 2,670,446 | Turner | Feb. 23, 1954 |
| 2,748,298 | Calosi et al. | May 29, 1956 |

FOREIGN PATENTS

| | | |
|---|---|---|
| 855,182 | France | Feb. 5, 1940 |
| 1,087,439 | France | Aug. 25, 1954 |
| 1,087,440 | France | Aug. 25, 1954 |
| 452,583 | Germany | Nov. 14, 1927 |

---

[2] The weldment may be warm to the touch after the weld due to the application of the elastic vibratory energy.

[3] The temperatures to which the foregoing statements refer are those which can be measured by burying diminutive thermocouples in the weld zone prior to welding, as well as the temperatures which can be estimated or approximated from a metallographic examination of a cross-section of a vibratory weld in the ordinary magnification range up to about 500 diameters.

[4] A mixture consisting of elemental aluminum and aluminum oxide.